(12) United States Patent
Chika et al.

(10) Patent No.: US 10,817,762 B2
(45) Date of Patent: Oct. 27, 2020

(54) PRINTING DEVICE AND NON-TRANSITORY COMPUTER READABLE MEDIUM

(71) Applicant: FUJI XEROX CO., LTD., Tokyo (JP)

(72) Inventors: Yusuke Chika, Kanagawa (JP); Hiroshi Kimura, Kanagawa (JP); Akinori Kashiwagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/558,859

(22) Filed: Sep. 3, 2019

(65) Prior Publication Data
US 2020/0311500 A1    Oct. 1, 2020

(30) Foreign Application Priority Data

Mar. 25, 2019    (JP) ................................. 2019-057420

(51) Int. Cl.
     *G06K 15/00*    (2006.01)
     *G06K 15/02*    (2006.01)

(52) U.S. Cl.
     CPC ......... *G06K 15/403* (2013.01); *G06K 15/002* (2013.01); *G06K 15/1809* (2013.01); *G06K 15/408* (2013.01)

(58) Field of Classification Search
     CPC ............... G06K 15/403; G06K 15/408; G06K 15/1809; G06K 15/002

USPC ...................................................... 358/1.14
See application file for complete search history.

(56) References Cited

U.S. PATENT DOCUMENTS

| | | | |
|---|---|---|---|
| 2002/0051192 A1 | 5/2002 | Utsunomiya | |
| 2007/0201071 A1* | 8/2007 | Yamada | G06F 3/1205 358/1.13 |
| 2010/0044949 A1* | 2/2010 | Nakamura | B65H 29/60 271/3.17 |

FOREIGN PATENT DOCUMENTS

| | | |
|---|---|---|
| JP | 2002-067453 A | 3/2002 |
| JP | 2005-258151 A | 9/2005 |
| JP | 2010-047350 A | 3/2010 |

* cited by examiner

*Primary Examiner* — Tammy Paige Goddard
*Assistant Examiner* — Darryl V Dottin
(74) *Attorney, Agent, or Firm* — Oliff PLC

(57) ABSTRACT

A printing device includes: an acquisition section that acquires print information including the number of print sheets and the number of print copies relating to a print job; and a control section that performs a control to output a print product to a first output section, to switch from the first output section to a second output section using the print information if the number of prints will exceed a full storage capacity of the first output section halfway through a process from first print of a first job to Y-th copy of an X-th job, provided that X and Y are not simultaneously 1, and to output a print product to the second output section from first print of the Y-th copy of the X-th job.

10 Claims, 10 Drawing Sheets

PRINTING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-057420 filed Mar. 25, 2019.

BACKGROUND

(i) Technical Field

The present disclosure relates to a printing device and a non-transitory computer readable medium.

(ii) Related Art

JP-A-2010-047350 discloses a printing device that includes plural output trays, a paper sensor detecting that a stacked amount of papers reaches a predetermined amount for each output tray, an emptiness sensor detecting that the paper is not stacked on the output tray, for each output tray, and an output control unit setting the output tray used as an output destination, in which when it is detected that the stacked amount of the paper on the output tray used as an output destination reaches the predetermined amount in printing execution, the output control unit switches an output destination to another output tray that is detected that the paper is not stacked thereon at that point and on which the paper is to be stacked such that a printed side is in the same direction as the paper on the output tray being used as an output destination, and continues printing.

JP-A-2002-067453 discloses a printing control system that controls a printing order of print jobs transferred from a host device to a printing device including plural output trays, a detection unit that detects a stacked amount of papers stacked on each output tray, a management unit that analyzes a content of each print job and manages the printing order of print data, a determination unit that detects whether the stacked amount on the output tray used as an output destination of a priority-scheduled print job, that is scheduled to be firstly printed, reaches equal to or higher than a predetermined value based on the detected stacked amount of each output tray, and a print job changing unit that changes the printing order of each print job such that another print job having the stacked amount lower than the predetermined value is firstly printed instead of the priority scheduled print job when it is determined that the stacked amount on the output tray that is an output destination of the priority scheduled print job reaches equal to or higher than the predetermined value.

JP-A-2005-258151 discloses an image output device including plural output trays, a designation unit that designates some or all of the plural output trays among the plural output trays so as to be virtually controlled as one output tray, and a switching unit that switches the virtual one output tray designated by the designation unit in accordance with a state of another output tray.

In that case, when the print product is output to a first output section and then output to a second output section after the full storage capacity is reached in the first output section, the output destination would be changed halfway through printing a copy.

SUMMARY

Aspects of non-limiting exemplary embodiments of the present disclosure relate to avoiding changing the print output destination halfway through printing a copy if the output destination should be changed from a first output section to a second output section because the full storage capacity of the first output section will be reached halfway through outputting the print product.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printing device including: an acquisition section that acquires print information including the number of print sheets and the number of print copies relating to a print job; and a control section that performs a control to output a print product to a first output section, to switch from the first output section to a second output section using the print information if the number of prints will exceed a full storage capacity of the first output section halfway through a process from first print of a first job to Y-th copy of an X-th job, provided that X and Y are not simultaneously 1, and to output a print product to the second output section from first print of the Y-th copy of the X-th job.

BRIEF DESCRIPTION OF THE DRAWINGS

Exemplary embodiments of the present invention will be described in detail based on the following figures, wherein.

DETAILED DESCRIPTION

Hereinafter, an example of an exemplary embodiment according to the present disclosure will be described based on the drawings.

First Exemplary Embodiment

Printing Device 10

Figure 1:
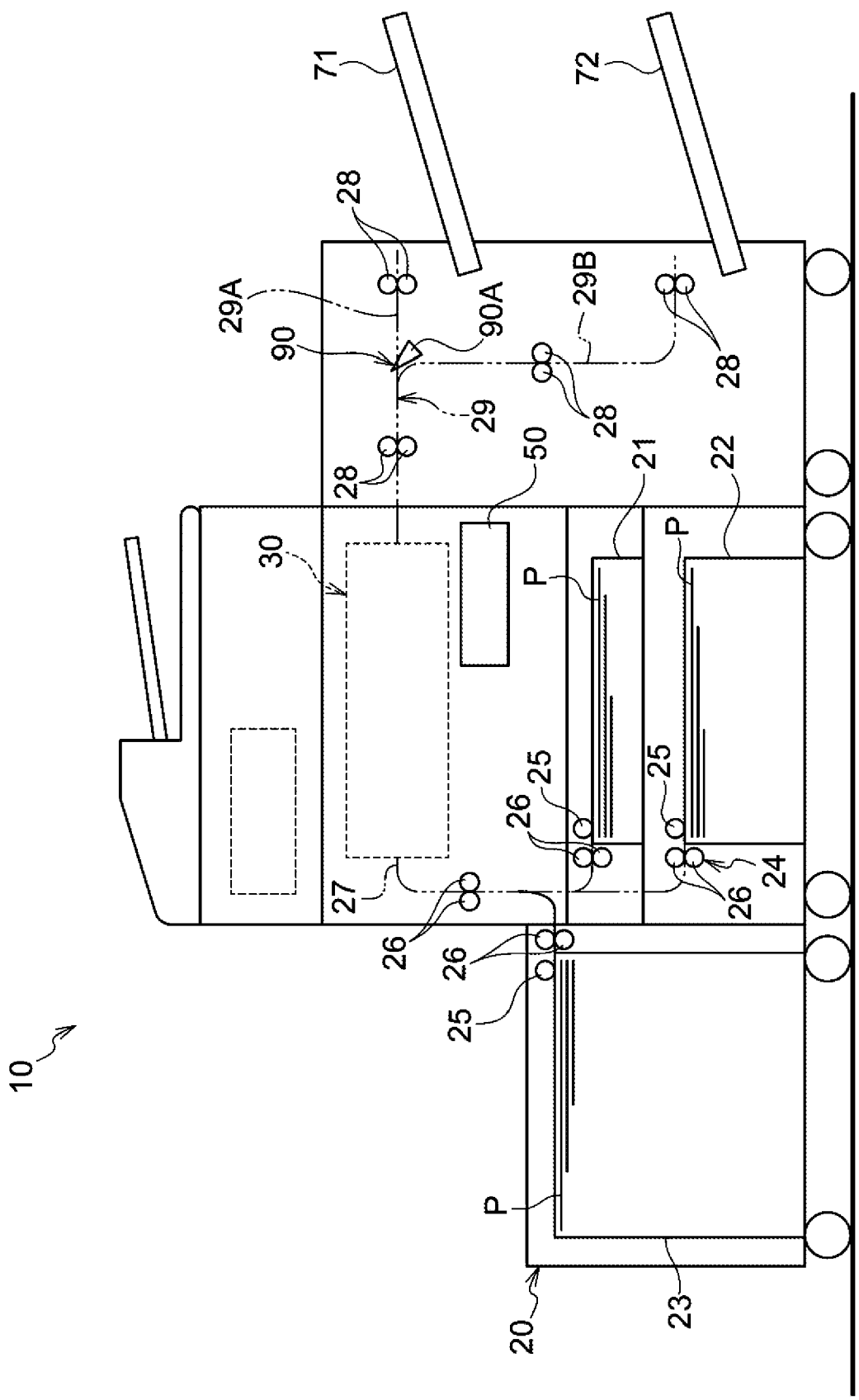
FIG. 1 is a schematic diagram showing a configuration of a printing device according to a first exemplary embodiment.

First, a configuration of a printing device 10 according to the present exemplary embodiment will be described. FIG. 1 is a schematic diagram showing the configuration of the printing device 10 according to the exemplary embodiment.

The printing device 10 is an example of a printing device that prints an image on a paper P. Specifically, the printing device 10 prints the image on the paper P based on an acquired print job. The print job refers to a processing unit of print operation instructed by one print instruction.

The printing device 10 is also an example of an image forming apparatus that forms the image on the paper P. Also, the printed paper P is an example of a "print product". The paper P is an example of a recording medium.

More specifically, the printing device 10 includes accommodating sections 21, 22, 23, a printing section 30, an upper output section 71, a lower output section 72, and a control device 50 as described in FIG. 1.

Accommodating Sections 21, 22, 23

The accommodating sections 21, 22, 23 have a function to accommodate papers P to be supplied to the printing section 30. Specifically, for example, the accommodating sections 21, 22, 23 each include an accommodating tray on which the papers P are stacked and accommodated. More specifically, the accommodating sections 21, 22, 23 accommodate, for example, the papers P of different sizes.

The number of papers P that can be accommodated (hereinafter, referred to as the accommodatable number of sheets) is large in the order of the accommodating sections 21, 22, 23. Specifically, for example, the accommodatable number of sheets of the accommodating section 21 is 500 sheets, the accommodatable number of sheets of the accommodating section 22 is 1250 sheets, and the accommodatable number of sheets of the accommodating section 23 is 2500 sheets.

In addition, one or two accommodating sections may be provided, or four or more accommodating sections may be provided.

Transport Section 24

A transport section 24 has a function to transport the papers P accommodated in the accommodating sections 21, 22, 23 to the printing section 30. Specifically, the transport section 24 includes, for example, a feed roll 25 that feeds the paper P from each of accommodating sections 21, 22, 23, and plural transport roll pairs 26 disposed along a transporting path 27 from the accommodating sections 21, 22, 23 to the printing section 30.

In the transport section 24, the feed roll 25 feeds the paper P from any of the accommodating sections 21, 22, 23 and plural transport roll pairs 26 transports the paper P to the printing section 30, so that the paper P is supplied to the printing section 30. Incidentally, the transport section 24 feeds the paper P from the accommodating section that accommodates the paper of the size designated in the print job among the accommodating sections 21, 22, 23, and supplies the paper P to the printing section 30.

Moreover, the transport section 24 has a function to transport the paper P printed by the printing section 30 to any of the upper output section 71 and the lower output section 72. Specifically, the transport section 24 includes, for example, plural transport roll pairs 28 disposed along the transporting path 29 from the printing section 30 to the upper output section 71 and the lower output section 72, and a switching mechanism 90 that switches an output destination.

Specifically, the switching mechanism 90 has a switching member 90A that is movable to a first position for opening a path 29A from the printing section 30 to the upper output section 71 and closing a path 29B from the printing section 30 to the lower output section 72, and to a second position for closing the path 29A and opening the path 29B.

In the transport section 24, the plural transport roll pairs 28 transports the paper P printed by the printing section 30 in a state where the switching member 90A is positioned at the first position, so that the paper P is output to the upper output section 71. Further, the plural transport roll pairs 28 transports the paper P printed by the printing section 30 in a state where the switching member 90A is positioned at the second position, so that the paper P is output to the lower output section 72. Incidentally, in FIG. 1, a state where the switching member 90A is positioned at the second position is illustrated.

Printing Section 30

The printing section 30 has a function to print the image onto the paper P. Specifically, the printing section 30 prints the image onto the paper P by the electrophotographic process. More specifically, the printing section 30 prints the image onto the paper P through the steps of charging, exposing, developing, transferring, and fixing, that is, forms the image. Therefore, the printing section 30 is also the image forming section that forms the image onto the paper P. Incidentally, the printing section 30 can execute double-sided printing for printing on both sides of the paper P.

Upper Output Section 71 and Lower Output Section 72

The upper output section 71 and the lower output section 72 are portions to which the printed paper P is output. The upper output section 71 and the lower output section 72 are vertically disposed as shown in FIG. 1. Specifically, the lower output section 72 is disposed below the upper output section 71.

Each of the upper output section 71 and the lower output section 72 has an upper limit on the number of available output sheets P, which can be output thereto. The full storage capacity of each of the upper output section 71 and the lower output section 72 is, for example, 500 sheets. That is, the upper output section 71 and the lower output section 72 have the same full storage capacity.

Here, the full storage capacity refers to the maximum number of sheets with which the upper output section 71 and the lower output section 72 can each be filled to capacity when the papers P are output to the upper output section 71 and the lower output section 72. The full storage capacity also refers to the upper limit number of papers P that can be output to the upper output section 71 and the lower output section 72, or the maximum number of papers P that can be accommodated on the upper output section 71 and the lower output section 72.

It will be understood that the full storage capacity is not limited to 500. Also, the upper output section 71 and the lower output section 72 may have different full storage capacities.

In the present exemplary embodiment, when the output destination is designated in the print job, the paper P is output to the designated upper output section 71 or the designated lower output section 72. In the print job, when the output destination is not designated, the paper P is firstly output to the preset output destination (one of the upper output section 71 and the lower output section 72), the switching member 90A is moved by switching control described later, and the paper P output destination is switched to the other of the upper output section 71 and the lower output section 72.

Here, the output section to which the paper P is firstly output (one of the upper output section 71 and the lower output section 72) is an example of a first output section. That is, a set output section described later is an example of the first output section. Further, the output section to which the paper P is output after the output destination is switched (the other of the upper output section 71 and the lower output section 72) is an example of a second output section. That is, a switched output section described later is an example of the second output section. In addition, as the output section, the configuration having three or more output sections may be adopted.

Control Device 50

Figure 2:
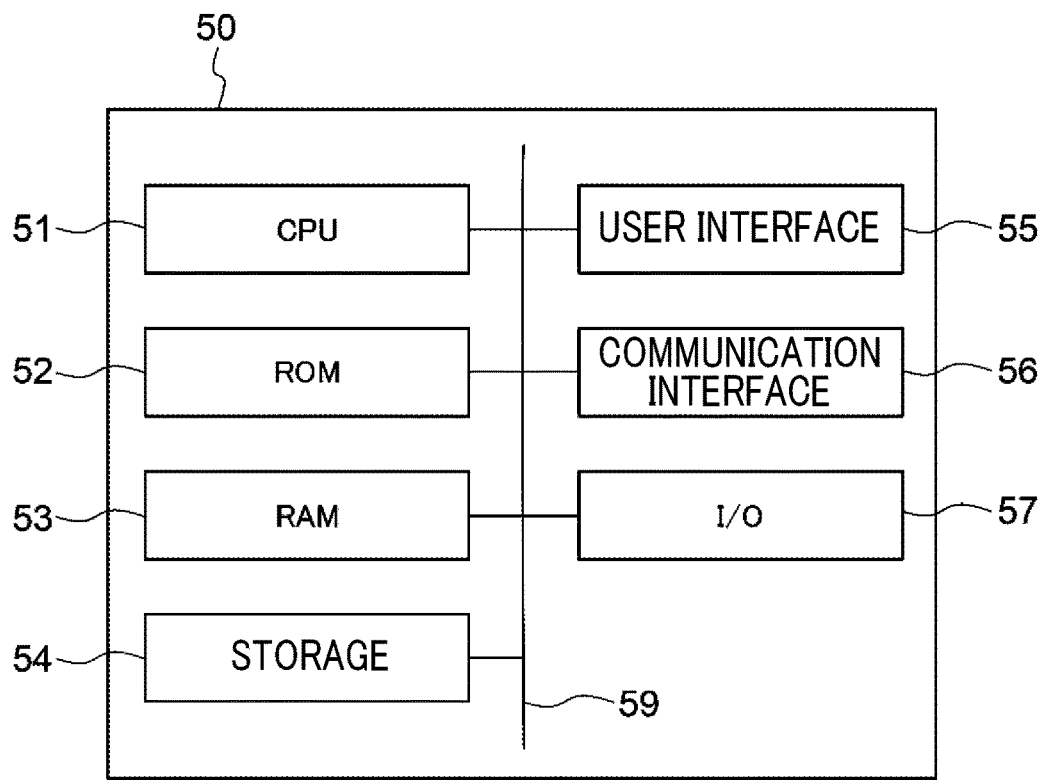
FIG. 2 is a block diagram showing a hardware configuration of a control device according to the first exemplary embodiment.

The control device 50 is a device that controls the operations of respective sections of the printing device 10. FIG. 2 is a block diagram showing a hardware configuration of a control device 50.

As shown in FIG. 2, the control device 50 has a function as a computer, and includes a central processing unit (CPU) 51, a read only memory (ROM) 52, a random access memory (RAM) 53, a storage 54, and a user interface 55, a communication interface 56, and an input/output (I/O) 57. Respective sections of the control device 50 are communicatably connected to one another via a bus 59.

The CPU 51 is a central arithmetic processing unit and executes various programs or controls each section. That is, the CPU 51 reads the program from the ROM 52 or the storage 54, and executes the program using the RAM 53 as a work area. The CPU 51 performs control of each section of the printing device 10 and various arithmetic processing in accordance with the programs stored in the ROM 52 or the storage 54.

The ROM 52 stores various programs and various data. The RAM 53 temporarily stores programs or data as the work area. The storage 54 includes a hard disk drive (HDD) or a solid state drive (SSD), and stores various programs including an operating system and various data.

The user interface 55 is an interface used when the user uses the printing device 10. The user interface 55 has, for example, an input section such as a button or a touch panel, and a display section such as a liquid crystal display. The user is a person who instructs the print job.

The communication interface 56 is an interface for communicating with a user terminal such as a personal computer. As a communication method of the communication interface 56, a wired or wireless method is used. As a communication standard of the communication interface 56, for example, Ethernet (registered trademark), FDDI, Wi-Fi (registered trademark) or the like is used. The I/O 57 connects the CPU 51 to each section of the printing device 10.

Figure 3:
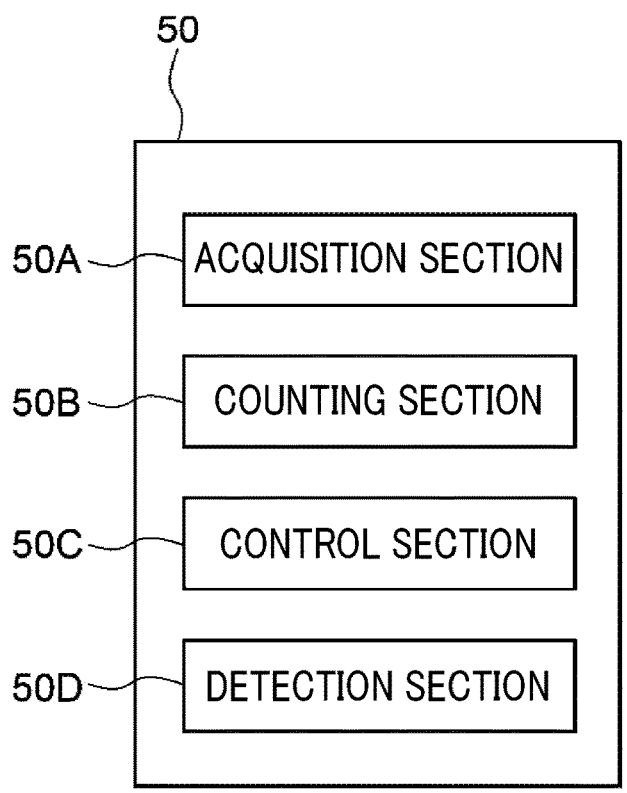
FIG. 3 is a block diagram showing an example of a functional configuration of the control device according to the first exemplary embodiment.

When executing the above programs, the control device 50 implements various functions using the above hardware resources. The functional configuration implemented by the control device 50 will be described. FIG. 3 is a block diagram showing an example of a functional configuration of the control device 50.

As shown in FIG. 3, the control device 50 has an acquisition section 50A, a counting section 50B, a control section 50C, and a detection section 50D as functional configurations. Each functional configuration is implemented by the CPU 51 reading out and executing the printing program and the table information stored in the ROM 52 or the storage 54.

The acquisition section 50A acquires the print job. In the print job, the number of print copies, the number of pages per copy of the print product, the presence or absence of execution of double-sided printing, the accommodating section to which the paper P is fed, the output destination to which the paper P is output, and the like are designated.

The acquisition section 50A also acquires information including the number of print copies, the number of pages per copy of the print product, information about whether to execute double-sided printing, accommodating section information, and output destination information, which are designated as print information regarding the print job.

Here, in the case of single-sided printing, the number of print sheets may be calculated by "the number of pages per copy of the print product×the number of print copies". Further, in the case of double-sided printing, the number of print sheets may be calculated by "the number of pages per copy of the print product×the number of print copies/2". Therefore, the number of print copies, the number of pages per copy of the print product, and information about whether or not to execute double-sided printing are typical pieces of information indicating the number of print sheets.

The print job is input by, for example, a print instruction via the user terminal communicatable through the communication interface 56, and the acquisition section 50A acquires the print job. Also, a print job may be generated by the reading of a document by a reading device (specifically, a scanner), and the acquisition section 50A may acquire the print job.

The counting section 50B counts the number of papers P output to the upper output section 71 or the lower output section 72. Specifically, the counting section 50B counts the number of passed paper sheets P using a detection unit such as an optical sensor provided on the transporting path 29 when counting the number of papers P output to the upper output section 71 or the lower output section 72.

The detection section 50D detects the number of paper sheets P remaining on each of the upper output section 71 and the lower output section 72. Specifically, the detection section 50D performs detection as follows.

First, the detection section 50D detects whether the paper P exists on each of the upper output section 71 and the lower output section 72. Specifically, the detection section 50D detects whether the paper P exists on each of the upper output section 71 and the lower output section 72 using a detection unit such as an optical sensor provided in each of the upper output section 71 and the lower output section 72.

When the paper P does not exist on each of the upper output section 71 and the lower output section 72, the detection section 50D detects the number of remaining paper sheets P as "0". When the paper P exists on each of the upper output section 71 and the lower output section 72, the detection section 50D detects the count by the counting section 50B as the number of remaining paper sheets P.

If the number of print sheets will exceed the full storage capacity of one of the upper output section 71 and the lower output section 72 halfway through a process from the first print sheet of the first job to the Y-th copy of the X-th job, provided that X and Y are not simultaneously 1, the control section 50C performs a switching control using the print information acquired by the acquisition section 50A, in which the output destination is changed from one of the upper output section 71 and the lower output section 72 to the other from the first print sheet of the Y-th copy of the X-th job. As for "X" and "Y" in "the Y-th copy of the X-th job", the case of "X=1 and Y=1", that is, the case where only one copy is printed in one job is excluded. Therefore, cases where "X" in "the Y-th copy of the X-th job" is 2 or more include cases where "Y" is 1, and cases where "Y" is 2 or more include cases where "X" is 1.

Operation of Control Device 50

Figure 4:
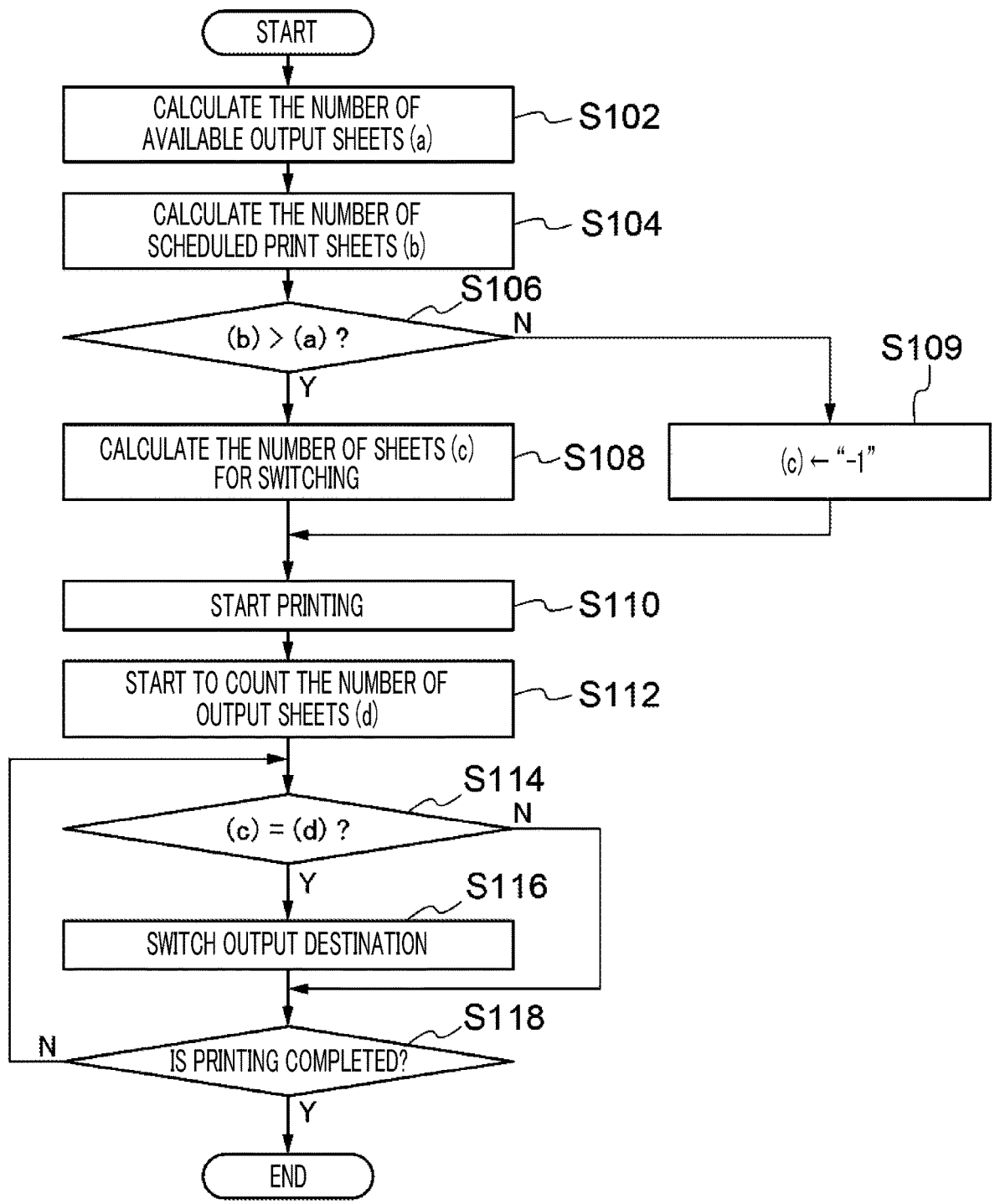
FIG. 4 is a flowchart showing a flow of print processing by the control device according to the first exemplary embodiment.

Next, the operation of the control device 50 will be described. FIG. 4 is a flowchart showing a flow of print processing by the control device 50.

The print processing is performed by the CPU 51 reading out and executing the printing program from the ROM 52 or the storage 54.

When the print job for which the output destination is not designated is acquired, the CPU 51 calculates the number of available output sheets (a) for one of the upper output section 71 and the lower output section 72 (hereinafter, referred to as a "set output section") which is the preset output destination (Step S102).

The number of available output sheets (a) in the set output section is calculated from, for example, the full storage capacity of the set output section and the number of remaining sheets in the set output section. Specifically, the number of available output sheets (a) in the set output section is obtained by "the full storage capacity of the set output section−the number of remaining sheets in the set output section". The number of remaining sheets in the set output section is detected by the detection section 50D as described above. For example, in a case where the full storage capacity of the set output section is 500 sheets and the number of remaining sheets in the set output section is 0 sheet, the number of available output sheets (a) is 500−0=500 sheets.

The CPU 51 calculates the number of print sheets P to be output to the set output section (hereinafter, referred to as "the number of scheduled print sheets (b)") (Step S104).

The number of scheduled print sheets (b) is calculated from the information including the number of print copies, the number of pages per copy of the print product, and information about whether to execute double-sided printing, which are acquired by the acquisition section 50A.

Specifically, in the case of single-sided printing, the number of scheduled print sheets (b) is calculated by "the number of pages per copy of the print product×the number of print copies". Further, in the case of double-sided printing, the number of scheduled print sheets (b) is calculated by "the number of pages per copy of the print product×the number of print copies/2".

For example, in a case where the number of pages per copy of the print product is 200, the number of print copies is 3, and single-sided printing is performed, the number of scheduled print sheets (b) is 200×3=600.

The CPU 51 determines whether the number of scheduled print sheets (b) is larger than the number of available output sheets (a) (Step S106). In Step S106, it is determined whether the number of print sheets will exceeds the full storage capacity of one of the upper output section 71 and the lower output section 72 halfway through a printing process from the first print sheet of the first job to the Y-th copy of the X-th job, provided that X and Y is not simultaneously 1.

When it is determined that the number of scheduled print sheets (b) is larger than the number of available output sheets (a) in Step S106, the CPU 51 calculates a timing to switch the output destination (Step S108). Specifically, the CPU 51 calculates the number of sheets to be output to the set output section before the switching of the output destination on the basis of the information acquired by the acquisition section 50A, including the number of print copies, the number of pages per copy of the print product, and information about whether to execute double-sided printing. Hereinafter, the calculated number of sheets refers to "the number of sheets (c) for switching".

More specifically, in Step S108, first, the number of print copies that can be output to the set output section is calculated. The number of print copies is calculated by "the number of available output sheets (a)/the number of sheets per copy of the print product". In the case of single-sided printing, the number of sheets per copy of the print product corresponds to the number of pages per copy of the print product. Further, in the case of double-sided printing, the number of sheets per copy of the print product is calculated by "the number of pages per copy of the print product/2".

In a case where the number of available output sheets (a) is 500 sheets and the number of sheets per copy of the print product is 200, the number of print copies is 500/200=2.5, which provides "2" when rounded to an integer.

Next, the number of sheets (c) for switching is calculated by "the number of print copies that can be output to the set output section×the number of sheets per copy of the print product". In a case where the number of print copies that can be output to the set output section is 2 and the number of sheets per copy of the print product is 200, the number of sheets (c) for switching is 200×2=400.

On the other hand, when it is determined that the number of scheduled print sheets (b) is smaller than the number of available output sheets (a) in Step S106, the number of sheets (c) for switching is set to "−1" (Step S109).

The CPU 51 starts printing (Step S110). Accordingly, the transport section 24 supplies the paper P from any of the accommodating sections 21, 22, and 23 designated in the print job to the printing section 30. Then, printing on the paper P is performed by the printing section 30, and the printed paper is output to the set output section. When printing is started, the count by the counting section 50B is reset to "0".

The CPU 51 causes the counting section 50B to start counting the number of paper sheets P (d) output to the set output section by printing (Step S112).

The CPU 51 determines whether the number of output sheets (d) counted by the counting section 50B and the number of sheets (c) for switching are the same (Step S114).

When the CPU 51 determines that the number of output sheets (d) and the number of sheets (c) for switching are the same in Step S114, the CPU 51 switches the output destination from the set output section (one of the upper output section 71 and the lower output section 72) to the other of the upper output section 71 and the lower output section 72 (hereinafter, referred to as the "switched output section") (Step S116), and causes the process to proceed to Step S118. The processing in Step S116 corresponds to the processing of switching the output destination for the print product from the first sheet of the Y-th copy of the X-th job.

On the other hand, when it is determined that the number of output sheets (d) is not equal to the number of sheets (c) for switching, the CPU 51 determines whether the printing job is completed (Step S118). When the CPU 51 determines that the printing is completed, the print processing is ended. When the CPU 51 determines that the printing is not completed, the process returns to Step S114.

In the exemplary embodiment, the print processing is performed according to the procedure described above. Therefore, if the number of print sheets will exceed the full storage capacity of the set output section (one of the upper output section 71 and the lower output section 72) halfway through the process from the first print sheet of the first job to the Y-th copy of the X-th job, provided that X and Y are not simultaneously 1, the switching control is performed in which the output destination for the print product is changed to the switched output destination (the other of the upper output section 71 and the lower output section 72) from the first print sheet of the Y-th copy of the X-th job.

Figure 5:
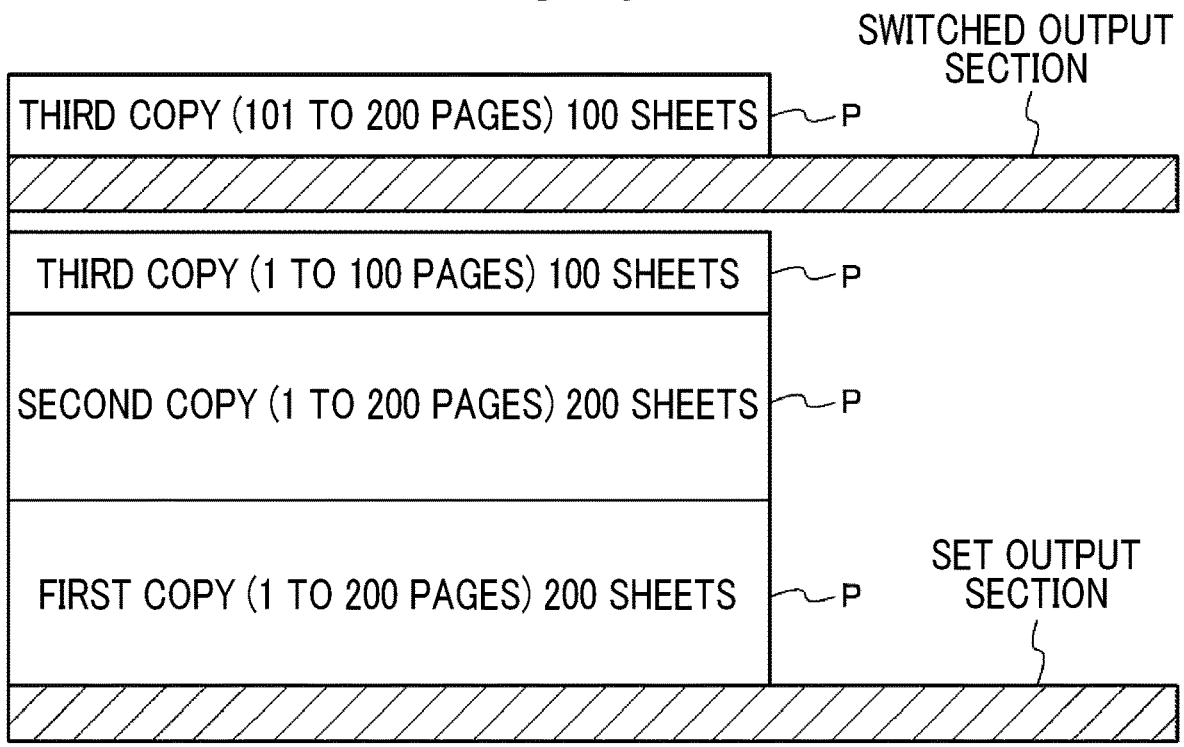
FIG. 5 is a schematic diagram schematically showing a state where a print product is output to an output section in a comparative example.

Otherwise, if the paper P is output to the set output section and the paper P output destination is changed to the switched output section when the set output section is filled to capacity, as shown in FIG. 5, the output destination can be changed halfway through printing one copy of the print product. In FIG. 5, the output destination is changed in the third copy.

Figure 6:
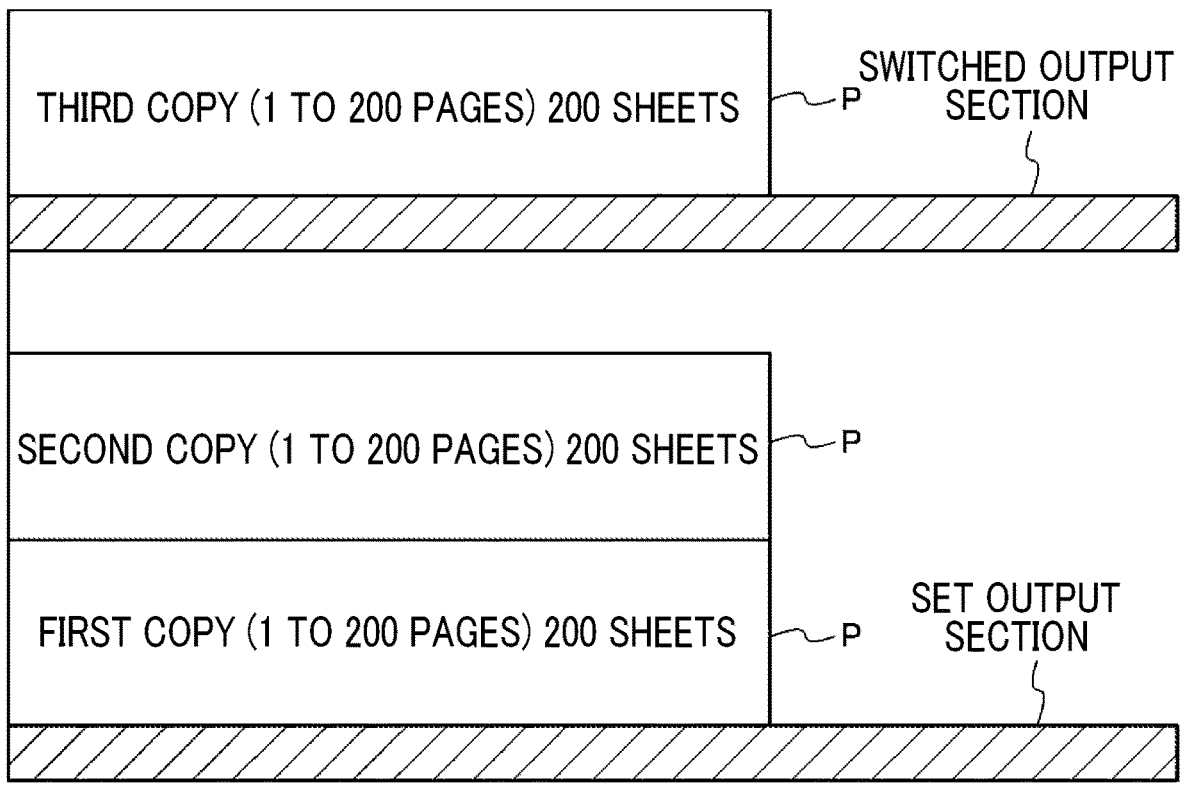
FIG. 6 is a schematic diagram schematically showing a state where a print product is output to an output section in the first exemplary embodiment.

In contrast, in the exemplary embodiment, the switching control is performed as described above, so that, as shown in FIG. 6, the print output destination is prevented from being changed halfway through printing one copy of the print product when the paper P output destination should be changed because the set output section will be filled to capacity halfway through outputting the paper sheets P to the set output section. FIGS. 5 and 6 show examples where the full storage capacity of each of the set output section and the switched output section is 500 sheets, the number of pages per copy of the print product is 200, the number of print copies is 3, and single-sided printing is performed.

Second Exemplary Embodiment

Figure 7:
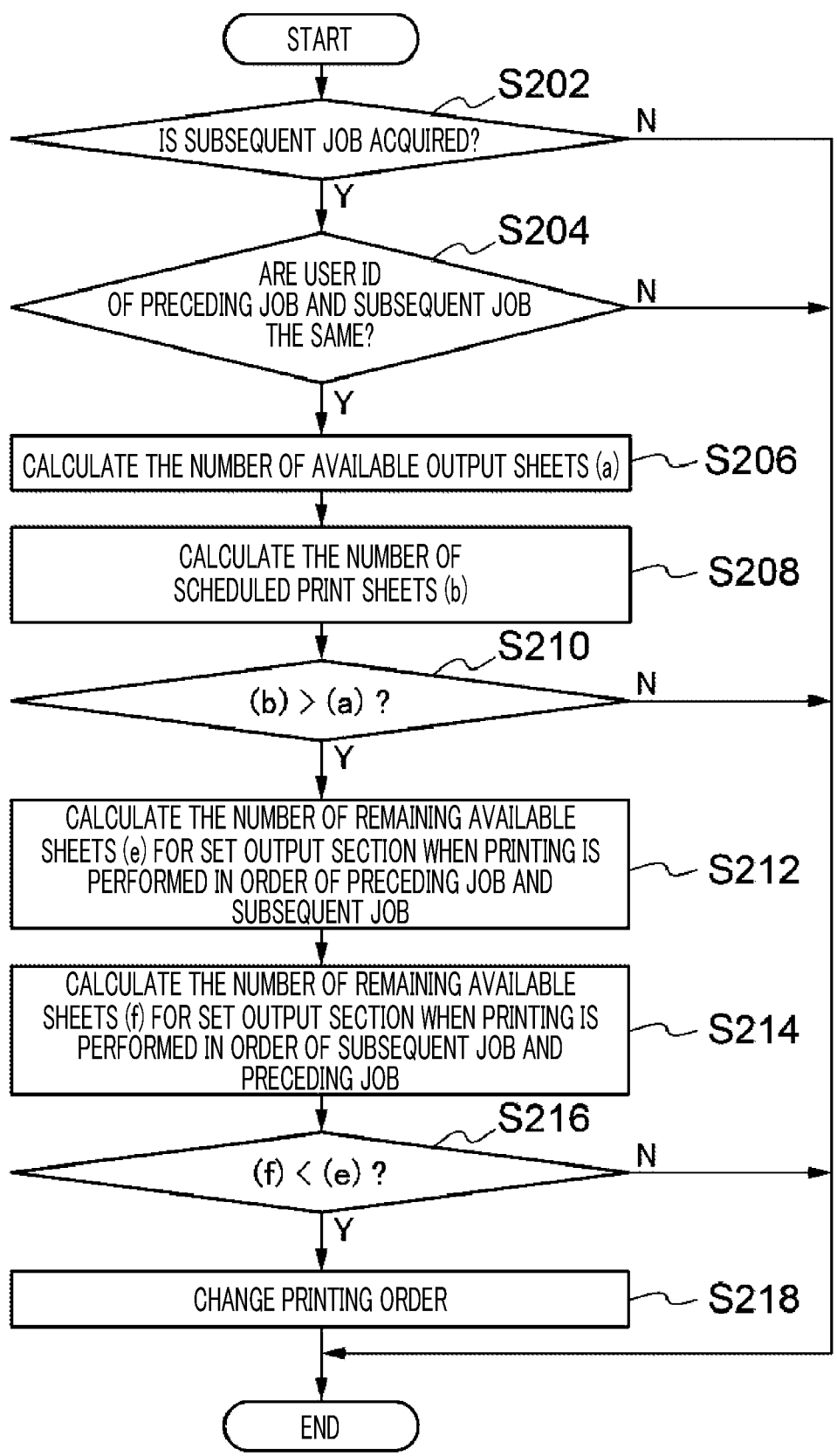
FIG. 7 is a flowchart showing a flow of print processing by a control device according to a second exemplary embodiment.

Next, a second exemplary embodiment will be described. FIG. 7 is a flowchart showing a flow of print processing by a control device according to the second exemplary embodiment. The same parts as those of the first exemplary embodiment are denoted by the same reference numerals, and the description thereof will be appropriately omitted.

In the second exemplary embodiment, the control section 50C performs a changing control to change the printing order prior to the switching control, when determining that there are plural print jobs to be executed and the number of remaining available sheets that can be further output to the set output section (one of the upper output section 71 and the lower output section 72) to the full storage capacity is smaller if the order of executing the print jobs is changed before the switching control than if the switching control is performed without changing the order of executing the print jobs.

Further, the control section 50C performs the changing control prior to the switching control when plural print jobs are instructed by the same person.

That is, in the exemplary embodiment, the changing control is performed as a pre-process before Step S102 in FIG. 4 as follows.

As shown in FIG. 7, when the CPU 51 acquires the print job (hereinafter referred to as a preceding job), the CPU 51 determines whether a subsequent print job (hereinafter referred to as a subsequent job) is acquired (Step S202). When the CPU 51 determines that the subsequent job is not acquired in step S202, the CPU 51 ends the processing.

When the CPU 51 determines that the subsequent job is acquired in Step S202, the CPU 51 determines whether the user IDs of the preceding job and the subsequent job are the same (Step S204). As described above, the user ID is used to determine whether the preceding job and the subsequent job are instructed by the same person. The user ID information is acquired by the acquisition section 50A as the print information relating to the print job.

When the CPU 51 determines that the user IDs of the preceding job and the subsequent job are different in Step S204, the CPU 51 ends the processing without changing the printing order.

When the CPU 51 determines that the user IDs of the preceding job and the subsequent job are the same in Step S204, the CPU 51 calculates the number of available output sheets (a) for the set output section (Step S206). The method for calculating the number of available output sheets (a) is the same as that in Step S102 described above.

The CPU 51 calculates the number of scheduled print sheets P (b) to be output to the set output section (Step S208). Here, the number of scheduled print sheets (b) corresponds to the total number of print sheets scheduled for the preceding job and the subsequent job. The method for calculating the number of scheduled print sheets is the same as that in Step S104 described above.

The CPU 51 determines whether the number of scheduled print sheets (b) is larger than the number of available output sheets (a) (Step S210).

When the CPU 51 determines that the number of scheduled print sheets (b) is smaller than the number of available output sheets (a), the CPU 51 ends the processing without changing the printing order.

When the CPU 51 determines that the number of scheduled print sheets (b) is larger than the number of available output sheets (a), the CPU 51 calculates the number of remaining available sheets (e) for the set output section in the case of printing in the order of the preceding job and the subsequent job (Step S212). The number of remaining available sheets refers to the number of papers P that can be further output to the set output section to the full storage capacity. In other words, the number of remaining available sheets is calculated by "the number of available output sheets (a)–the number of sheets (c) for switching".

Specifically, the number of remaining available sheets (e) is calculated as follows. The second exemplary embodiment will be described as being performed under the following printing conditions.

The number of available output sheets (a) for the set output section: 500
The number of print copies of the preceding job: 50
The number of sheets per copy of the print product of the preceding job: 6
The number of print copies of the subsequent job: 3
The number of sheets per copy of the print product of the subsequent job: 150

First, the number of available output sheets (a1) for the print product of the subsequent job, which can be output to the set output section, is calculated by "the number of available output sheets (a)–the number of print sheets scheduled for the preceding job". The number of sheets (a1) is, specifically, 500–6×50=200.

Next, the number of print copies for the print product of the subsequent job, which can be output to the set output section, is calculated. The number of print copies is calculated by "the number (a1) of available output sheets/the number of sheets per copy of the print product". The number of print copies is 200/150=1.33, which provides "1" when rounded to an integer.

Then, the number of remaining available sheets (e) is calculated if a possible copy number of the print product of the subsequent job is output to the set output section. The number of remaining available sheets (e) is 200−150×1=50.

In addition, the number of remaining available sheets (e) may be calculated as follows. If the printing is performed in the order of the preceding job and the subsequent job, the number of sheets (c) for switching is calculated by "the number of print sheets scheduled for the preceding job+(the number of available output print copies of the subsequent job, which can be output to the set output section,×the number of sheets per copy of the print product)". Therefore, the number of sheets (c) for switching is 6×50+1×150=450. Then, the number of remaining available sheets (e) is calculated by "the number of available output sheets (a)−the number of sheets (c) for switching". Thus, 500−450=50.

The CPU 51 calculates the number of remaining available sheets (f) in the set output section if the printing is performed in the order of the subsequent job and the preceding job (Step S214).

Specifically, the number of remaining available sheets (f) is calculated as follows, similarly to the number of remaining available sheets (e).

First, the number of available output sheets (a2) for the print product of the preceding job, which can be output to the set output section, is calculated by "the number of available output sheets (a)−the number of print sheets scheduled for the subsequent job". The number of sheets (a2) that can be output is, specifically, 500−150×3=50.

Next, the number of print copies for the print product of the preceding job, which can be output to the set output section, is calculated. The number of print copies is calculated by "the number of available output sheets (a2)/the number of sheets per copy of the print product". The number of print copies is 50/6=8.33, which provides "8" when rounded to an integer.

Then, the number of remaining available sheets is calculated if a possible number of print copies for the print product of the preceding job are output to the set output section. The number of remaining available sheets (f) is 50−6×8=2.

The number of remaining available sheets (f) may be calculated as follows. If the printing is performed in the order of the subsequent job and the preceding job, the number of sheets (c) for switching is calculated by "the number of print sheets scheduled for the subsequent job+ (the number of print copies that can be output to the set output section for the preceding job×the number of sheets per copy of the print product)". Therefore, the number of sheets (c) for switching is 150×3+6×8=498. Then, the number of remaining available sheets (f) is calculated by "the number of available output sheets (a)−the number of sheets (c) for switching". Thus, 500−498=2.

The CPU 51 determines whether the number of remaining available sheets (f) is smaller than the number of remaining available sheets (e) (Step S216).

When the CPU 51 determines that the number of remaining available sheets (f) is larger than the number of remaining available sheets (e) in Step S216, the CPU 51 ends the processing without changing the printing order.

When the CPU 51 determines that the number of remaining available sheets (f) is smaller than the number of remaining available sheets (e), the CPU 51 changes the printing order of the preceding job and the subsequent job (Step S218). That is, the CPU 51 changes the order of the image data to be printed between the preceding job and the subsequent job. The CPU 51 changes the printing order between the preceding job and the subsequent job, and then ends the processing.

In the exemplary embodiment, the changing control to change the printing order is performed prior to the switching control when the number of remaining available sheets for the set output section (one of the upper output section 71 and the lower output section 72) is smaller if the printing job order is changed and then the switching control is performed than if the switching control is performed without changing the printing job order.

Figure 8:
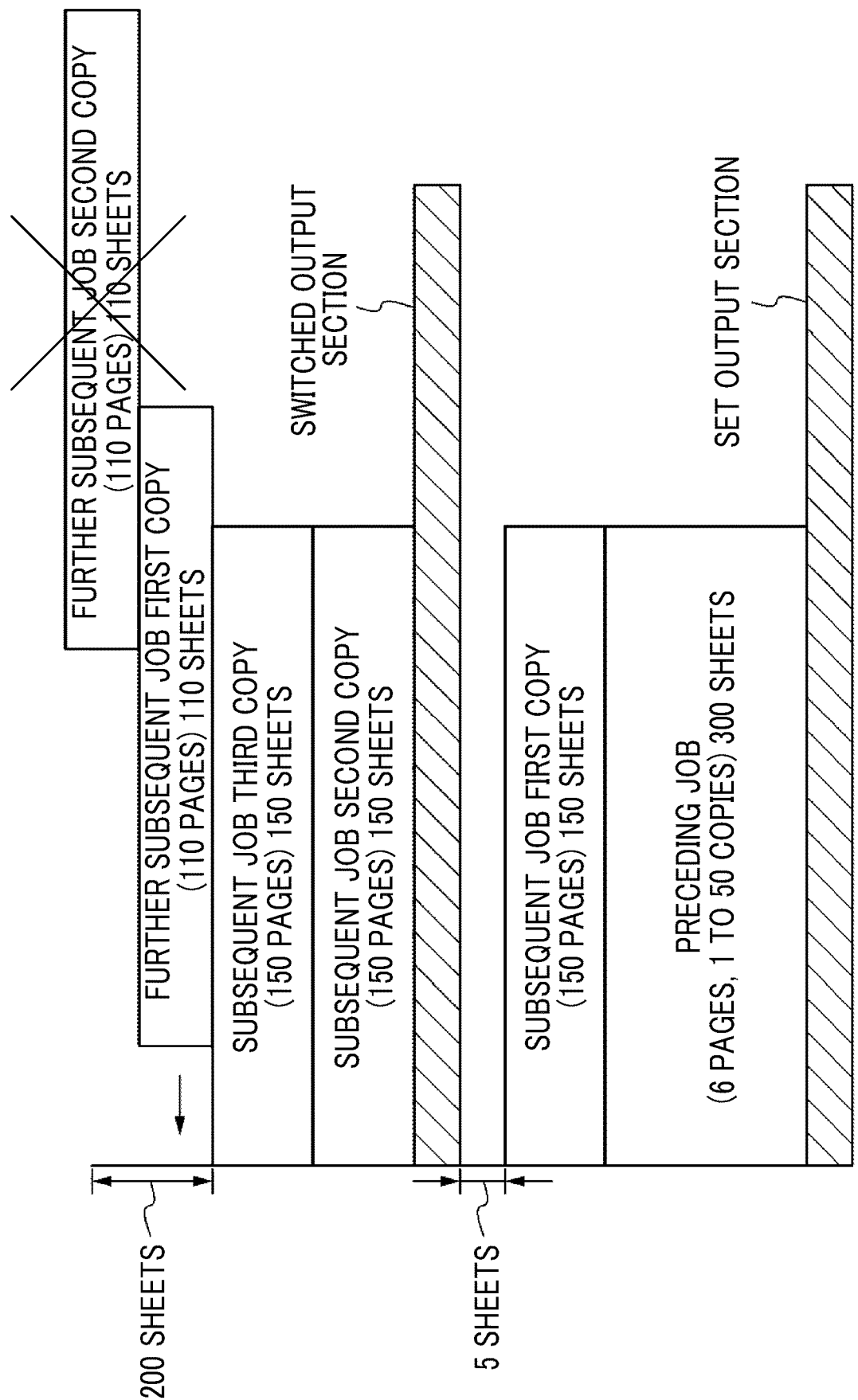
FIG. 8 is a schematic diagram schematically showing a state where the print product is output to the output section in a comparative example.

Otherwise, if only the switching control is performed (the comparative example), the printing is performed in the order of the preceding job and the subsequent job, under the printing conditions described above, so that the number of remaining available sheets is 50 as shown in FIG. 8. Furthermore, the number of remaining available sheets in the switched output section is 200. Therefore, for example, if the subsequent job in which "the number of print copies is 2 and the number of sheets per copy of the print product is 110" is further acquired, the paper P cannot be output to the switched output section.

Figure 9:
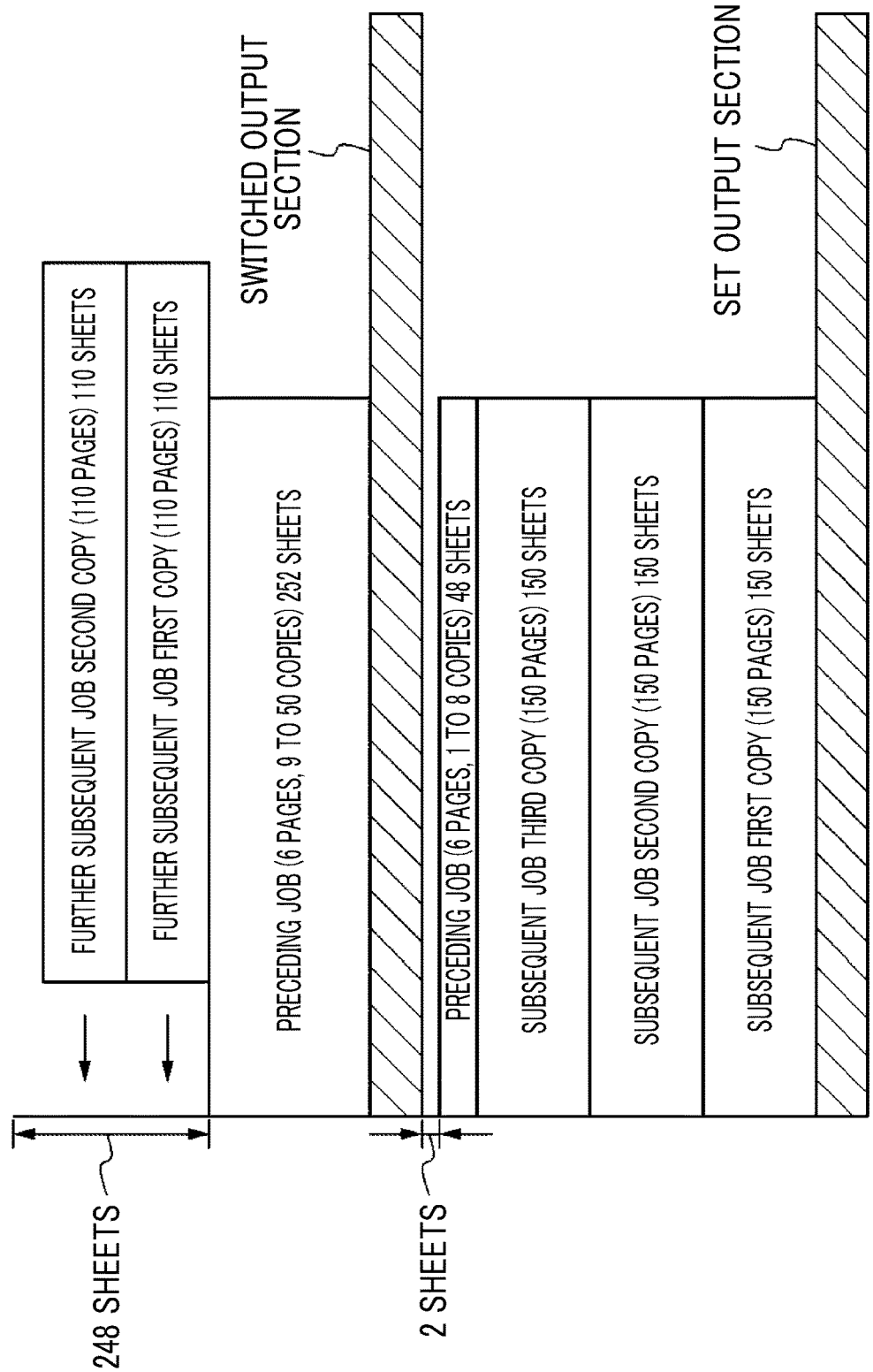
FIG. 9 is a schematic diagram schematically showing a state where a print product is output to an output section in the second exemplary embodiment.

In contrast, in the exemplary embodiment, the changing control to change the printing order is performed prior to the switching control when the number of remaining available sheets for the set output section is smaller if the printing job order is changed and then the switching control is performed than if the switching control is performed without changing the printing job order. Therefore, under the printing conditions described above, the number of remaining available sheets is 2 as shown in FIG. 9. In this case, therefore, the number of sheets that can be further output to the switched output section is larger than that in the comparative example shown in FIG. 8. For example, the number of remaining available sheets in the switched output section is 248. Therefore, if a subsequent job in which "the number of print copies is 2 and the number of sheets per copy of the print product is 110" is further acquired, the paper P can be output to the switched output section.

Furthermore, in the exemplary embodiment, when plural print jobs are instructed by the same person, the changing control is performed prior to the switching control. Therefore, the printing order can be prevented from being changed among plural jobs instructed by different people.

In the exemplary embodiment, when plural print jobs are instructed by the same person, the changing control is performed prior to the switching control, which is non-limiting. For example, when plural print jobs are instructed by different people, the changing control may be performed prior to the switching control.

Third Exemplary Embodiment

Figure 10:
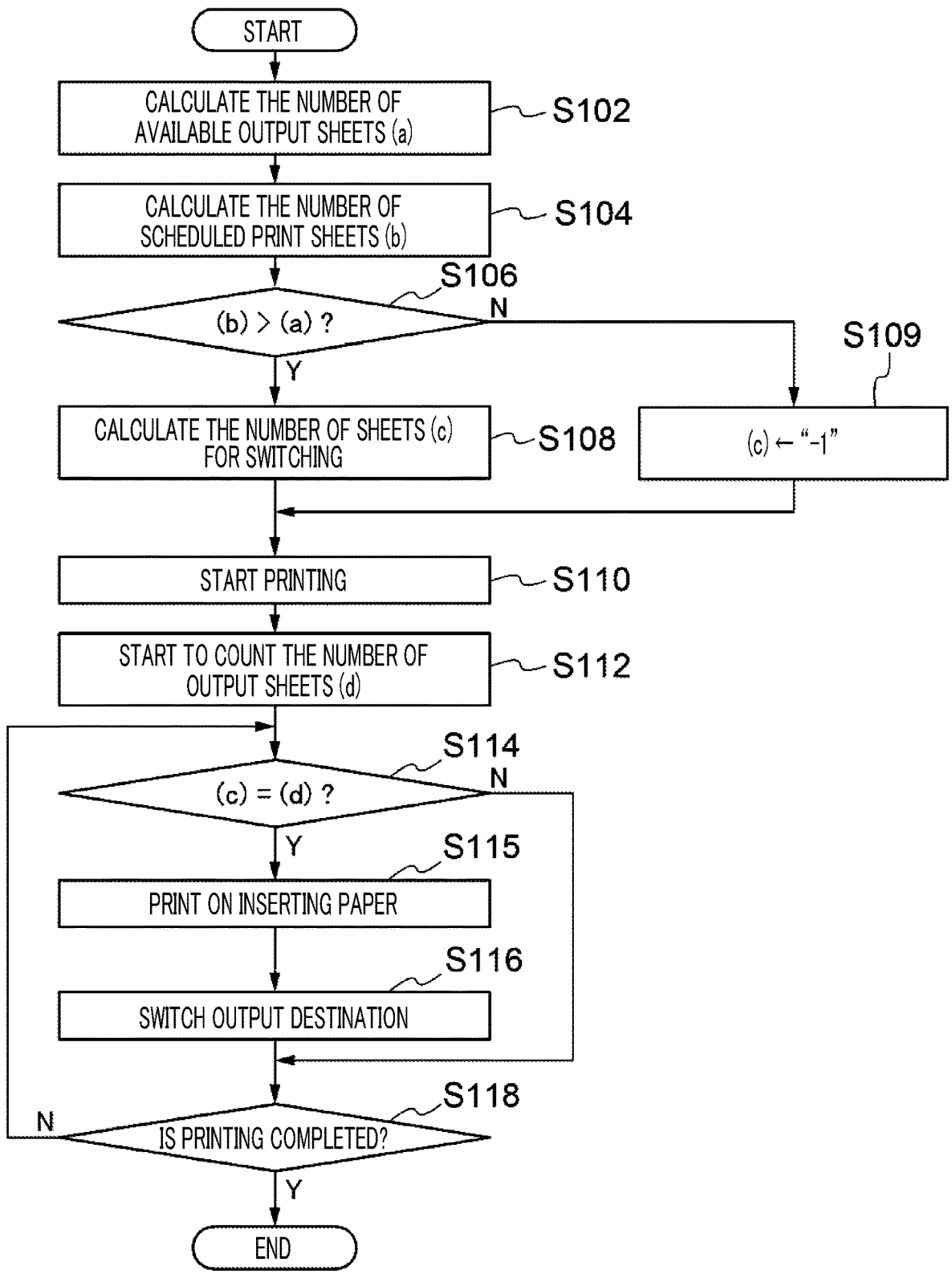
FIG. 10 is a flowchart showing a flow of print processing by a control device according to a third exemplary embodiment.

Next, a third exemplary embodiment will be described. FIG. 10 is a flowchart showing a flow of print processing according to the third exemplary embodiment. The same parts as those of the first exemplary embodiment are denoted by the same reference numerals, and the description thereof will be appropriately omitted.

In the third exemplary embodiment, when the control section 50C performs the switching control, the control section 50C further performs a presentation control to indicate that the switching of the output destination is performed (hereinafter, simply referred to as a "presentation control").

The presentation control may be a control to output, as the last output to the set output section, a paper P with printed information indicating that the paper P output destination for the next copy is the switched output section.

More specifically, the presentation control is a control to output a paper P with printed switching information indicating that the paper P output destination for the next copy is the switched output section, in which the paper with printed switching information is the last output to the set output section and the information is printed on the surface facing upward.

The operation according to the third exemplary embodiment will be described below.

Figure 11:
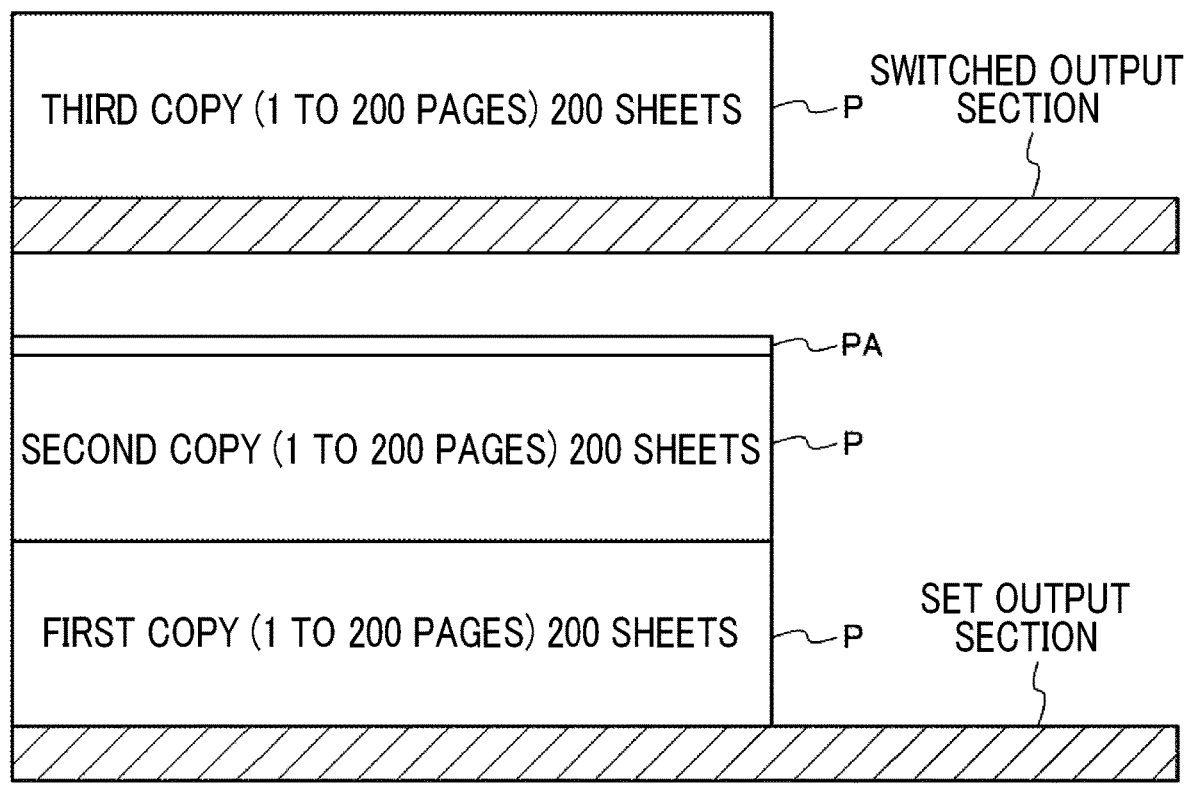
FIG. 11 is a schematic diagram schematically showing a state where an inserting paper is output to an output section in the third exemplary embodiment.
Figure 12:
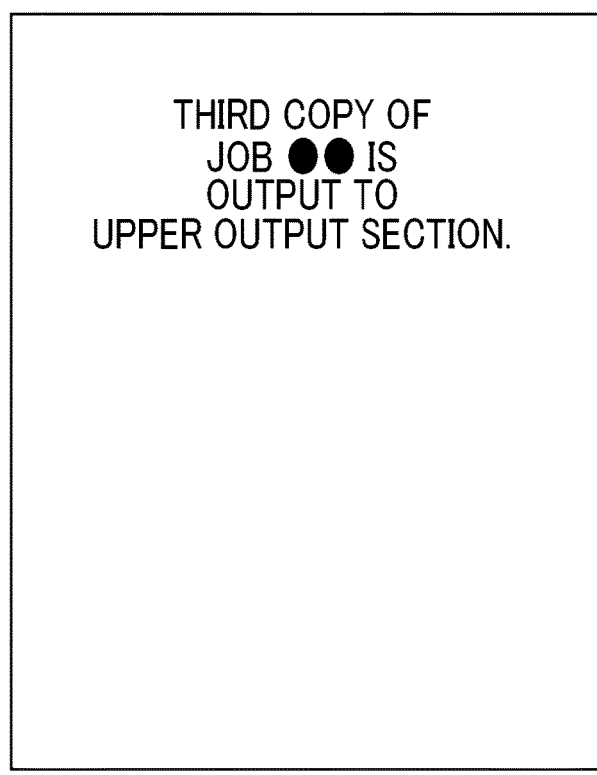
FIG. 12 is a diagram showing an example of a printed side of the inserting paper in the third exemplary embodiment.

As shown in FIG. 10, when the CPU 51 determines that the number of output sheets (d) and the number of sheets (c) for switching are the same in Step S114, the CPU 51 indicates that the switching of the output destination is performed (Step S115). Specifically, as shown in FIG. 11, printing on an inserting paper PA is performed, and then the inserting paper PA is output to the set output section. As shown in FIG. 12, the switching information indicating that the output destination for the next copy is the switched output section is printed on the inserting paper PA. Also, the inserting paper PA is output with its printed surface facing upward. FIG. 12 shows an example where the set output section is the lower output section 72, and the paper P is output to the upper output section 71 as the switched output section.

Further, after the inserting paper PA is output, the output destination is switched from the set output section (one of the upper output section 71 and the lower output section 72) to the switched output section (the other of the upper output section 71 and the lower output section 72) (Step S116).

As described above, in the exemplary embodiment, the control section 50C further performs the presentation control when performing the switching control. In this case, therefore, the switching of the output destination is easier to recognize than in the case where only the switching control is performed.

Also, in the exemplary embodiment, the inserting paper with printed information indicating that the output destination for the next copy is the switched output section is output to the set output section. In this case, therefore, the print output destination for the next copy is easier to recognize than in the case where only the switching of the output destination is presented.

Furthermore, in the exemplary embodiment, the inserting paper is output with its printed surface facing upward, having printed information indicating that the output destination for the next copy is the switched output section. In this case, therefore, the output destination for the next copy is easier to recognize than in the case where the inserting paper having printed information indicating the output destination for the next copy is output with its printed surface facing downward.

Incidentally, the switching information may be displayed on the user terminal that can be communicated through the communication interface 56 or on a display section such as a liquid crystal display of the user interface 55 instead of or in addition to the printing on the inserting paper PA.

Fourth Exemplary Embodiment

Figure 13:
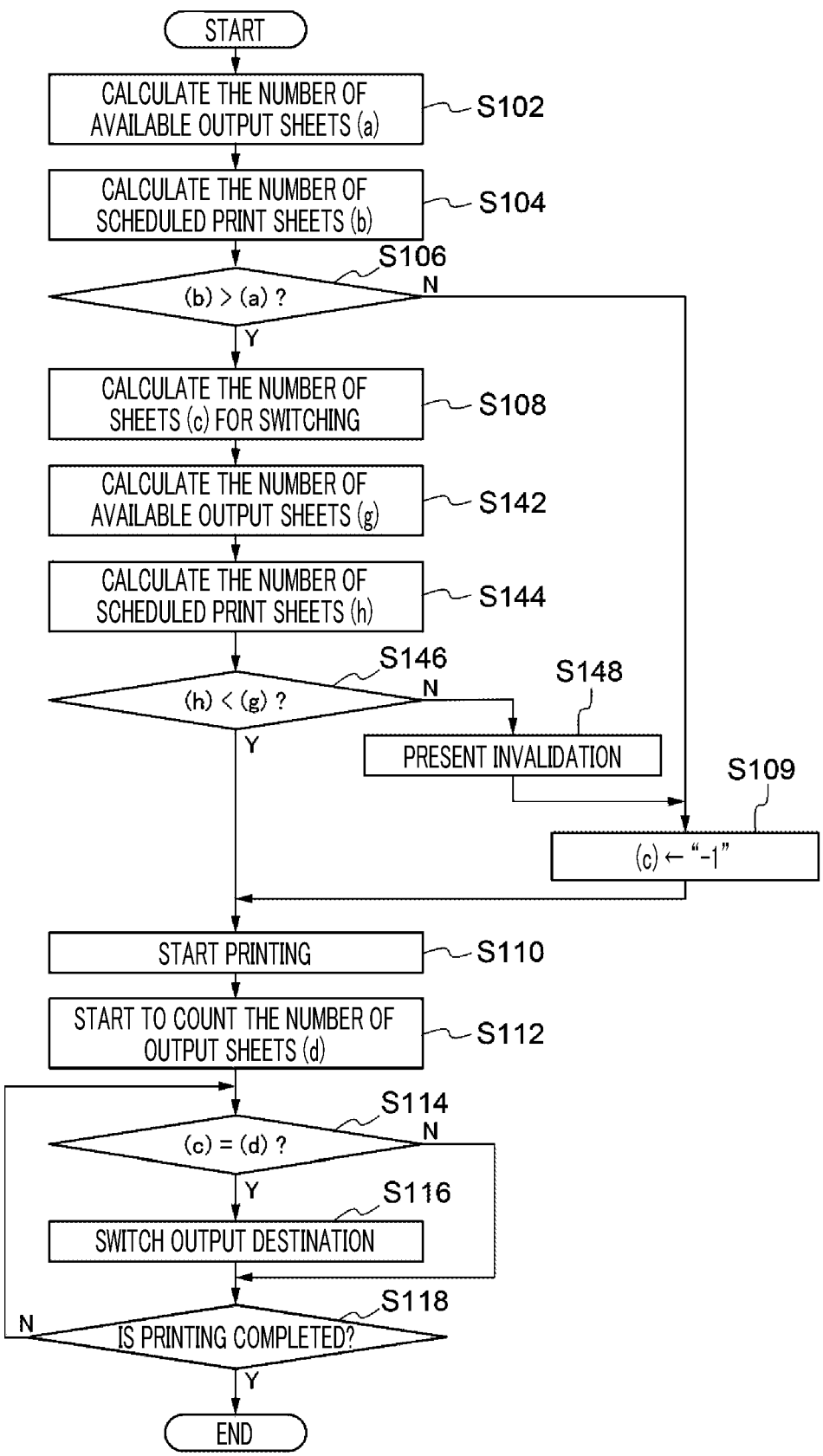
FIG. 13 is a flowchart showing a flow of print processing by a control device according to a fourth exemplary embodiment.

Next, a fourth exemplary embodiment will be described. FIG. 13 is a flowchart showing a flow of print processing by a control device according to the fourth exemplary embodiment. The same parts as those of the first exemplary embodiment are denoted by the same reference numerals, and the description thereof will be appropriately omitted.

In the fourth exemplary embodiment, the control section 50C performs an invalidation control to invalidate the switching control if, as a result of the switching control, the switched output section will be filled to capacity.

The control section 50C further performs an invalidation presentation control to indicate that the output destination is not to be switched when the invalidation control is performed.

The operation according to the fourth exemplary embodiment will be described below.

As shown in FIG. 13, the CPU 51 calculates the number of available output sheets (g) for the switched output section after Step S108 (Step S142). The number of available output sheets (g) for the switched output section is calculated from the full storage capacity of the switched output section and the number of remaining sheets in the switched output section. Specifically, the number of available output sheets (g) for the switched output section is calculated by "the full storage capacity of the switched output section−the number of remaining sheets in the switched output section". The number of remaining sheets in the switched output section is detected by the detection section 50D as described above. For example, when the full storage capacity of the switched output section is 500 sheets and the number of remaining sheets in the switched output section is 0, the number of available output sheets (g) is 500−0=500.

The CPU 51 calculates the number of print sheets P to be output to the switched output section (hereinafter, referred to as "the number of scheduled print sheets (h)") (Step S144). The number of scheduled print sheets (h) is calculated by "the number of scheduled print sheets (b)−the number of sheets (c) for switching".

The CPU 51 determines whether the number of scheduled print sheets (h) is smaller than the number of available output sheets (g) (Step S146). When the CPU 51 determines that the number of scheduled print sheets (h) is smaller than the number of available output sheets (g) in Step S146, the CPU 51 starts printing (Step S110).

On the other hand, when the CPU 51 determines that the number of scheduled print sheets (h) is larger than the number of available output sheets (g) in Step S146, the CPU 51 presents invalidation of switching of the output section (Step S148). The invalidation of switching of the output section may be displayed on the user terminal that can be communicated through the communication interface 56 or on a display section such as a liquid crystal display of the user interface 55. Then, the number of sheets (c) for switching is set to "−1" (Step S109).

In the exemplary embodiment, the control section 50C performs an invalidation control to invalidate the switching control if, as a result of the switching control, the switched output section will be filled to capacity. Therefore, an unnecessary switching operation is prevented in contrast to the case where the switching control is executed when the switched output section is filled to capacity.

Further, in the exemplary embodiment, the control section 50C further performs an invalidation presentation control to indicate that the output destination is not to be switched when the invalidation control is performed. In this case, the invalidation of switching of the output destination is easier to recognize than in the case where only the invalidation control is performed.

In the exemplary embodiment, the control section 50C further performs the invalidation presentation control to indicate that switching of the output destination is not to be performed, when the invalidation control is performed, which is non-limiting. The control section 50C may be configured to perform the invalidation control without performing the presentation control.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing device comprising:
a controller programmed to
acquire print information including a number of print sheets and a number of print copies relating to a print job; and
control the printing device to output a print product to a first output section, and if the number of print sheets from a first print of a first job to part of Y-th copy of an X-th job will reach a full storage capacity of the first output section, provided that X and Y are not simultaneously 1, to switch from the first output section to a second output section in order to output the print product to the second output section from first print of the Y-th copy of the X-th job before the first output section is full.

2. The printing device according to claim 1, wherein
the controller is programmed to change an order of executing print jobs prior to the switch from the first output section to the second output section when there are a plurality of print jobs to be executed and a number of remaining available sheets that can be further output to the first output section to the full storage capacity is smaller if an order of executing the print jobs is changed before the switch from the first output section to the second output section than if the switch from the first output section to the second output section is performed without changing the order of executing print jobs.

3. The printing device according to claim 2, wherein
the controller is configured change the order of executing print jobs prior to the switch from the first output section to the second output section when the plurality of print jobs are instructed by a same person.

4. The printing device according to claim 1, wherein
the controller is configured to control a presentation to indicate that an output destination is switched when the switch from the first output section to the second output section is performed.

5. The printing device according to claim 4, wherein
the presentation is printed information indicating that the output destination for a next copy is the second output section, wherein the print product is a last output to the first output section.

6. The printing device according to claim 5, wherein
the printed information indicates that the output destination for a next copy is the second output section, wherein the print product is a last output to the first output section and has the printed information printed on a surface facing upward.

7. The printing device according to claim 1, wherein
the controller is configured to invalidate the switch from the first output section to the second output section if, as a result of the switch from the first output section to the second output section, the second output section will be filled to capacity.

8. The printing device according to claim 7, wherein
the controller is configured to control a presentation to indicate that an output destination is not to be switched when the switch from the first output section to the second output section is invalidated.

9. A non-transitory computer readable medium storing a program causing a computer to execute a printing process comprising:
acquiring print information including a number of print sheets and a number of print copies relating to a print job; and
outputting a print product to a first output section, to switch from the first output section to a second output section using the print information if the number of print sheets from a first print of a first job to part of Y-th copy of an X-th job will reach a full storage capacity of the first output section, provided that X and Y are not simultaneously 1, in order to output the print product to the second output section from first print of the Y-th copy of the X-th job before the first output section is full.

10. A printing device comprising:
a controller programmed to
acquire print information including a number of print sheets and a number of print copies relating to a print job; and
control the printing device to output a print product to a first output section, and if there are at least two print jobs and the number of print sheets from a print copy of a second or later print job will exceed a full storage capacity of the first output section, switch output of the print product for the second or later print job to a second output section before the first output section is full.

* * * * *